United States Patent [19]

McCallister et al.

[11] Patent Number: 4,486,846
[45] Date of Patent: Dec. 4, 1984

[54] NUMERICALLY CONTROLLED OSCILLATOR USING QUADRANT REPLICATION AND FUNCTION DECOMPOSITION

[75] Inventors: Ronald D. McCallister; Daniel Shearer, III, both of Scottsdale, Ariz.

[73] Assignee: Motorola Inc., Schaumburg, Ill.

[21] Appl. No.: 392,852

[22] Filed: Jun. 28, 1982

[51] Int. Cl.³ .................. G06F 15/32; H03B 19/00
[52] U.S. Cl. .................................... 364/607; 364/721; 328/14
[58] Field of Search .............. 364/607, 608, 718, 719, 364/721; 328/14, 142

[56] References Cited

U.S. PATENT DOCUMENTS

| | | | |
|---|---|---|---|
| 3,898,446 | 8/1975 | Vatz | 364/721 X |
| 4,068,178 | 1/1978 | Tunzi | 364/718 X |
| 4,134,072 | 1/1979 | Bolger | 364/721 X |
| 4,159,526 | 6/1979 | Mosley et al. | 364/721 |
| 4,159,527 | 6/1979 | Yahata et al. | 364/721 |
| 4,172,286 | 10/1979 | Wess | 364/721 |
| 4,342,245 | 8/1982 | Gross | 364/718 X |
| 4,346,448 | 8/1982 | Insam et al. | 364/607 |
| 4,410,955 | 10/1983 | Burke et al. | 364/721 X |

*Primary Examiner*—Jerry Smith
*Assistant Examiner*—Allen MacDonald
*Attorney, Agent, or Firm*—Eugene A. Parsons

[57] ABSTRACT

A numerically controlled oscillator wherein only one quadrant of a sinusoidially shaped wave is stored in a read-only-memory and the address of the read-only-memory is generated so that the entire numerically controlled oscillator and the read-only memory are contained on a single semiconductor chip. The data required to reproduce the quadrant is stored in a decomposed format so as to reduce the size of the read-only-memory.

17 Claims, 9 Drawing Figures

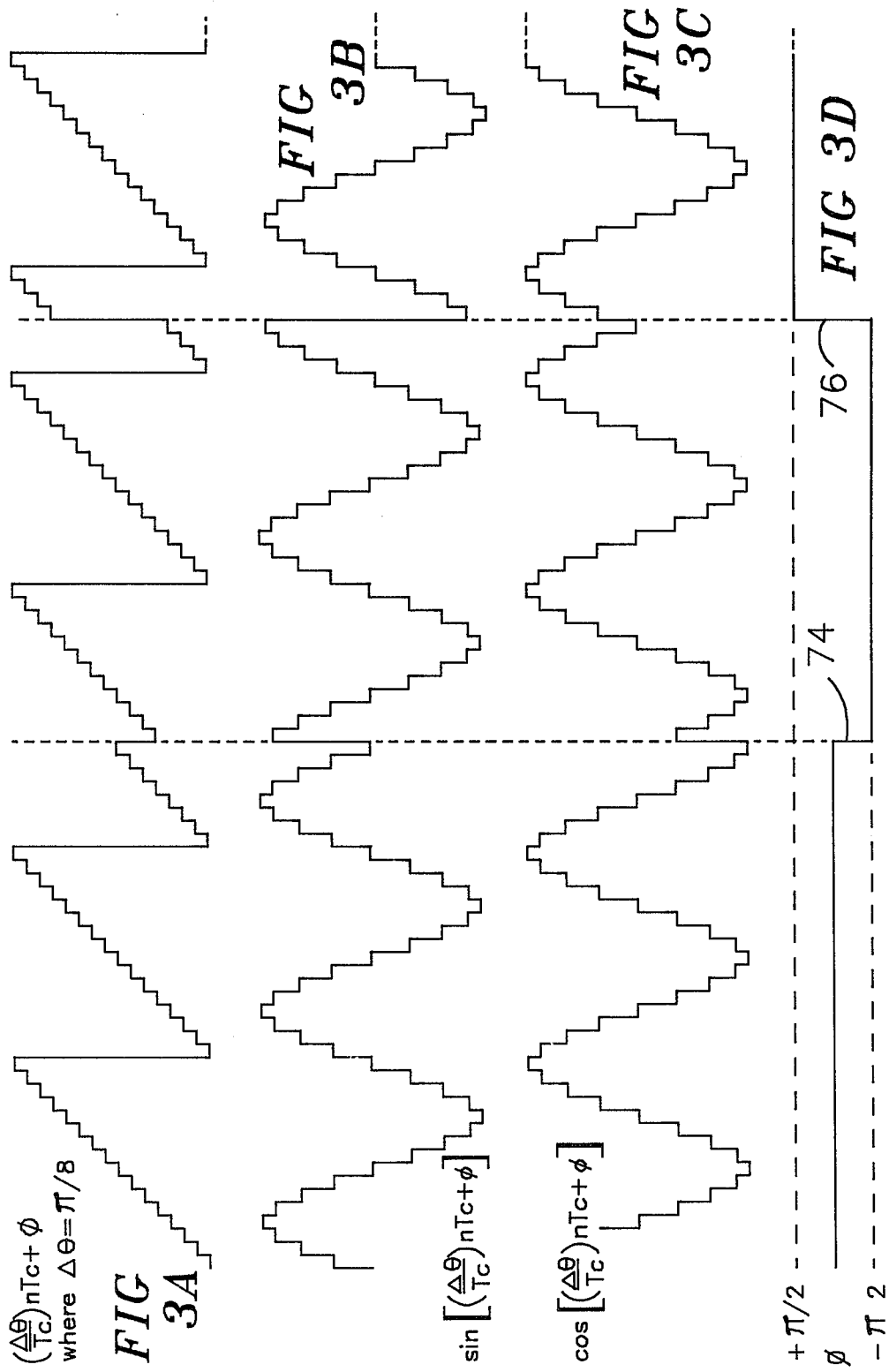

4,486,846

NUMERICALLY CONTROLLED OSCILLATOR USING QUADRANT REPLICATION AND FUNCTION DECOMPOSITION

BACKGROUND OF THE INVENTION

Conventional frequency synthesizers accomplish the generation of many different frequencies from one or more stable sources by means of analog circuits or by a combination of analog and digital circuits. In these approaches, the generation of frequencies is performed in the analog or continuous sense by division, phase lock, mixing, or some combination of these techniques.

A numerically controlled oscillator (NCO) generates a sinusoidal wave form whose frequency is digitally controlled. The greatly increased demand for a high speed, low power NCO derives directly from two clear trends in communication technology: (1) the rapidly expanding role of digital techniques and processing; and (2) the increasing emphasis upon precise frequency control. Although the speed, power, and size considerations dictate integrated circuit NCO implementation, previously available design and processing techniques have been inadequate to satisfactorily resolve the conflict between stringent performance requirements and the limitations of practical technology. Prior art NCO's were formed on a plurality of semiconductor chips, generally at least a read-only-memory is external to the main NCO chip, which greatly increased the space and amount of power required.

SUMMARY OF THE INVENTION

The present invention pertains to a function generator and more particularly to a function generator for use in or as a numerically controlled oscillator. Specifically, the present invention is a function generator for generating generally sinusoidal waves having a digitally controlled frequency, said generator including coarse digital memory means for storing a plurality of digital values coarsely defining one quadrant of a sinusoidal wave, fine digital memory means for storing a plurality of digital values which when added to predetermined values stored in said coarse memory means substantially define the one quadrant of the sinusoidal wave, digital addition means connected to combine outputs of said coarse and fine memories to substantially define the one quadrant of the sinusoidal wave, digital logic means for shifting the combined output values to substantially define second, third and fourth quadrants of the sinusoidal wave, and address generating means for controlling the coarse and fine memory means and the digital logic means to generate a continuous sinusoidal wave at a frequency dictated by an input digital signal.

The output data from the function generator can be applied to a conventional D/A converter and a low pass filter which results in a nearly perfect sine wave at the desired frequency. The entire digital frequency control and generation circuitry is available on one low power, radiation hardened semiconductor chip. In fixed frequency mode, the stability of the function generator/synthesizer is determined by the stability of one external fixed frequency oscillator. There are no analog control elements or variable oscillators to introduce instability. The output is generated digitally from the single external oscillator, which can be built with higher radiation resistance, better thermal and aging characteristics, and greater stability than would be possible if analog control elements and variable oscillators were required.

It is an object of the present invention to provide a new and improved numerically controlled oscillator/function generator.

It is a further object of the present invention to provide a numerically controlled oscillator having the entire digital frequency control and generation circuitry available on a single semiconductor chip.

These and other objects of this invention will become apparent to those skilled in the art upon consideration of the accompanying specification, claims and drawings.

BRIEF DESCRIPTION OF THE DRAWINGS

Referring to the drawings, wherein like characters indicate like parts throughout the figures:

FIGS. 3A, B, C and D are analog representations of the output of the digital address generator of FIG. 1, the sinusoidally varying digital output of the combining circuits of FIG. 2, the 90° phase shifted sinusoidally varying digital output of the combining circuits of FIG. 2, and a waveform illustrating step phase shifts applied to the apparatus of FIG. 1, respectively;

DESCRIPTION OF THE PREFERRED EMBODIMENTS

Figure 1:
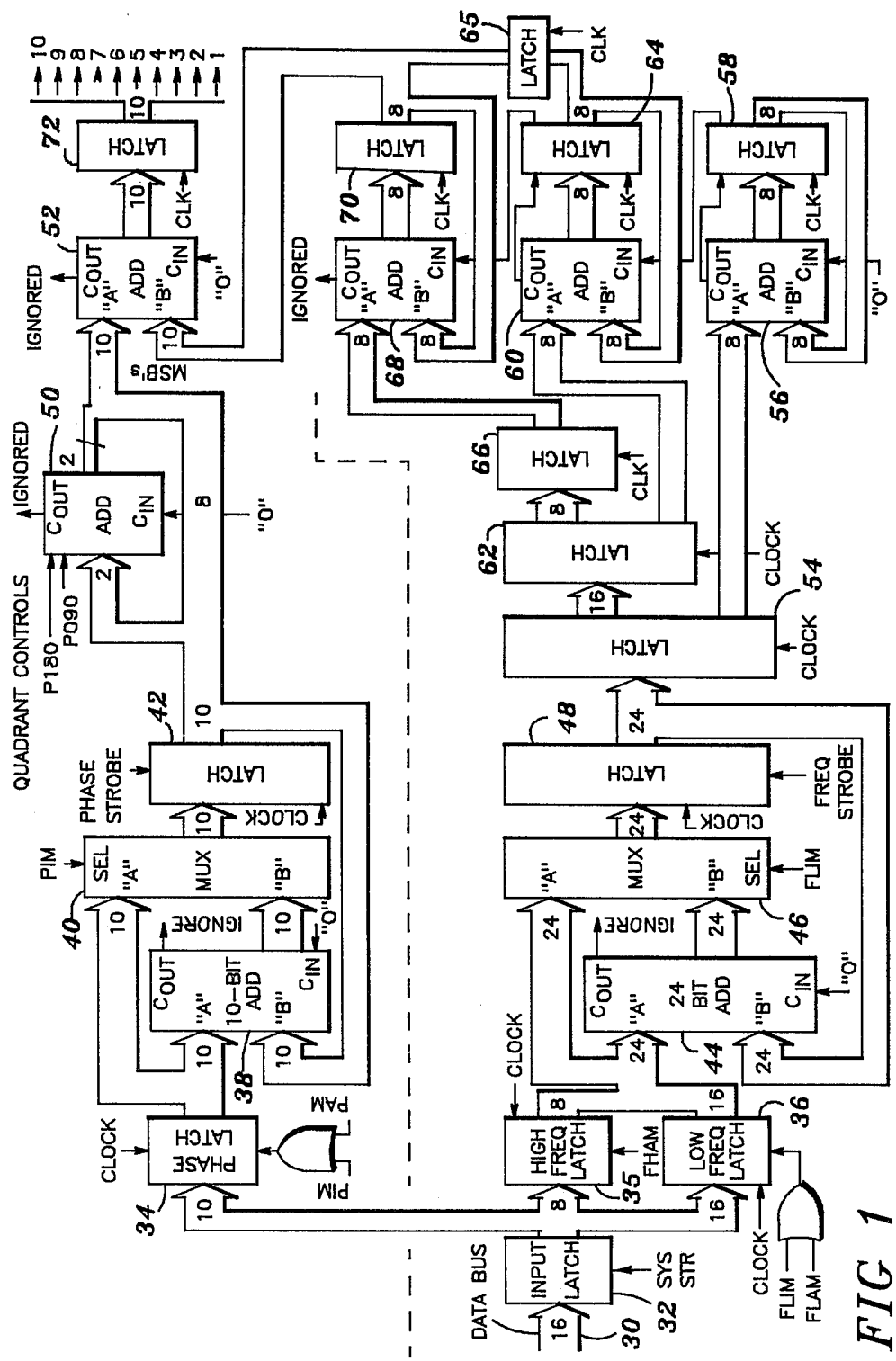
FIG. 1 is a block diagram of the address generating portion of a numerically controlled oscillator embodying the present invention.
Figure 2:
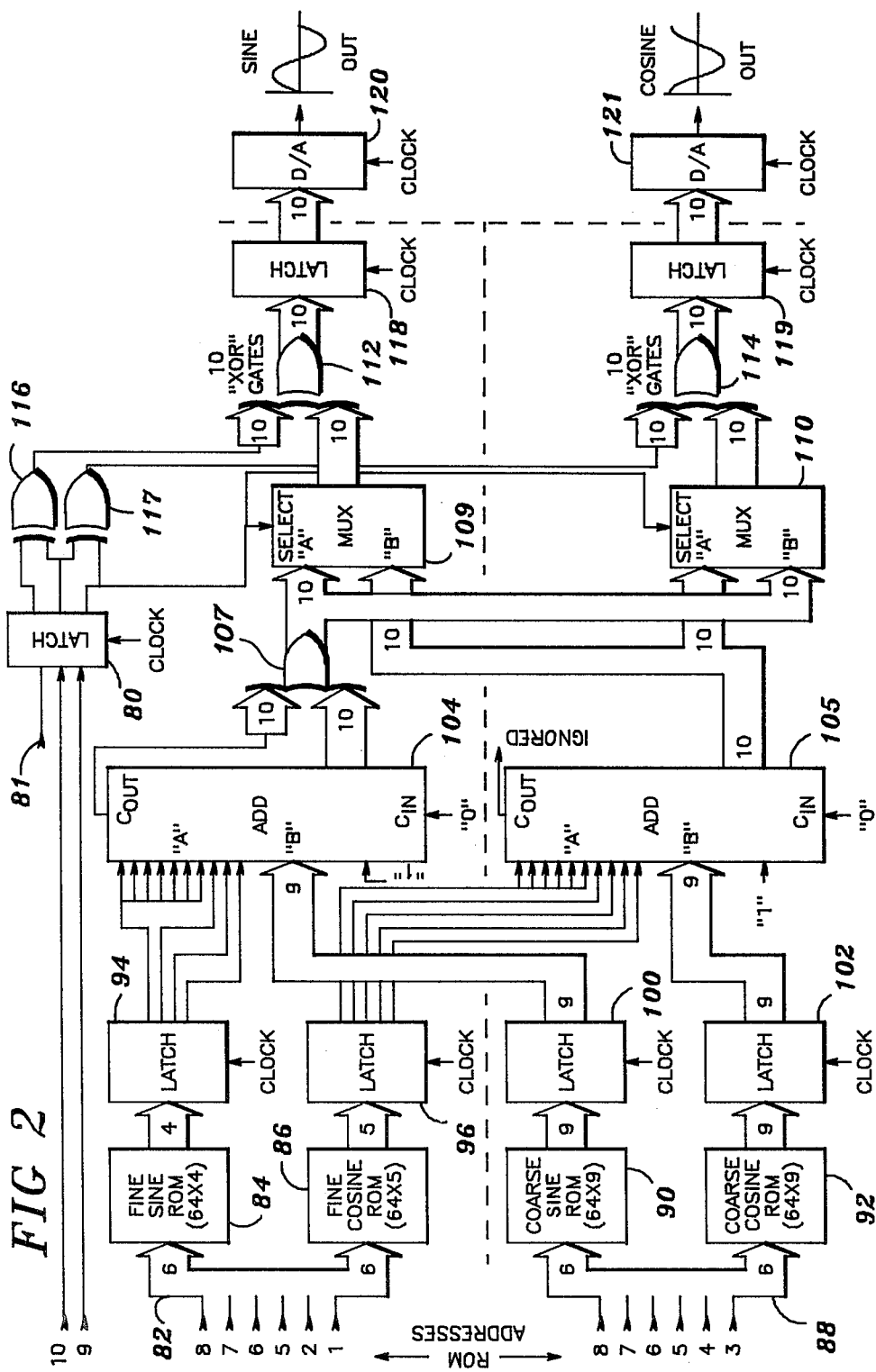
FIG. 2 is a block diagram of the remaining portion of the numerically controlled oscillator illustrated in FIG. 1, illustrating the memories and combining portions of the generator.

A specific embodiment of the present invention is illustrated in FIGS. 1 and 2. The following is a general description of the construction and operation of the specific embodiment illustrated. Referring to FIG. 1, a 16 line input data bus, designated 30, serves as an input for all phase and frequency information. The 16 bit bus is designed to interface compatably with microprocessors and the like and is connected to an input latch 32 which is enabled by a system strobe signal. The input latch 32 is enabled by the system strobe to facilitate proper input latching of potentially asynchronous input data on the data bus 30. A second set of latches 34, 35, and 36 are operated by a system clock, which is a steady, crystal-controlled clock (not shown) that is the reference used to clock all internal timing of the numerically controlled oscillator. The second set of latches 34, 35, and 36 are connected to the input latch 32 and the data contained in the latch 32 is transferred, on the occurrence of the next system clock pulse. The function of the two sets of latches is to re-time the data before it is input to the succeeding circuitry.

Latch 34 is a phase latch for 10 bits of information representative of the desired phase of the output signal, as instructed by the input data. The phase latch 34 supplies the 10 bits of phase data to an add circuit or accumulator 38 and to a first input of a multiplexer 40. The output of the accumulator 38 is supplied to a second input of the multiplexer 40. In a standard mode of operation the multiplexer 40 selects the 10 bits supplied to the first input from the latch 34 and supplies it to a latch 42 which is operated by a phase strobe. The phase strobe is internal timing pulses necessary to properly coordinate the phase data which is to be input to the next stage. In a phase integrate mode (PIM) a signal is supplied to a control input of the multiplexer 40 to select the output from the accumulator 38. The output from the latch 42 is supplied to a second input of the accumulator 38 to supply the required feedback for integration in the integrate mode of operation. The 10 bit word at the output of the latch 42 represents a desired output phase.

In a fashion similar to that described for the phase portion of the input data, the latch 35 is a latch for 8 bits of the input data representing high frequency while the latch 36 is a latch for 16 bits of the input data representing low frequency and the two are combined to form a 24 bit word which is supplied to a first input of an add circuit or accumulator 44 and to a first input of a multiplexer 46. The output of the accumulator 44 is supplied to a second input of the multiplexer 46 and a control input of the multiplexer 46 controls the multiplexer between the first input in a normal mode of operation and the second input in a frequency low-order bits integrate mode (FLIM). The output of the multiplexer 46 is supplied to a latch 48 which is controlled by a frequency strobe consisting of internal timing pulses necessary to properly coordinate the frequency data which is to be input to the next stages. The output of the latch 48 is fed back to a second input of the accumulator 44 to provide the integration in the integrating mode of operation. The output of the latch 48 is a 24 bit word representing a desired output frequency.

The two most significant bits of the 10 bit phase word from the latch 42 are supplied to an input of an add circuit 50. The add circuit 50 has two other inputs for receiving phase shift commands of 180° and 90° (see FIG. 3D). The two most significant bits are modified if a 180° or 90° command is supplied to the add circuit 50, otherwise they remain constant and are supplied along with the 8 least significant bits to a first input of a second add circuit 52. The 24 bit frequency word from the latch 48 must be added to the 24 bit binary value stored in latches 70, 64, 58 on every system clock pulse to produce the linearly stepped digital signal illustrated in FIG. 3A. A parallel 24 bit adder would slow down the system considerably so a concept known as pipelining is used here to increase the speed three-fold. Although throughput speed is increased by the pipelining concept, throughput delay is concommittently increased by 3 system clock periods.

The 24 bit frequency word is supplied to a clocked latch 54. The 8 least significant bits of the 24 bit input word are supplied to a first input of an add circuit 56, the output of which is supplied to a clocked latch 58 and the output of the clocked latch is supplied to a second input of the add circuit 56. Carry signals from the addition process are supplied through the latch 58 to the carry input of an add circuit 60. The 16 remaining bits of the 24 bit word are supplied from the latch 54 to a clocked latch 62. 8 of the 16 bits supplied to the latch 62 are supplied to a first input of the add circuit 60, the output of which is supplied to a clocked latch 64. The 8 output bits of the latch 64 are supplied to a second input of the add circuit 60 to provide the constant updating. Also, the two most significant bits in the output of the latch 64 are supplied through a clocked latch 65 as two least significant bits of a 10 bit frequency word. The remaining 8 bits from the latch 62 are supplied to a clocked latch 66, the output of which is supplied to a first input of an add circuit 68. The output of the add circuit 68 is connected to a clocked latch 70, the output of which is connected to a second input of the add circuit 68 to produce the constant updating of the frequency word. The 8 bits out of the latch 70 are also combined with the two bits from the latch 65 to produce a 10 bit frequency word which is connected to a second input of the add circuit 52. The 10 bit phase word supplied to the first input of the add circuit 52 is added to the 10 bit frequency word supplied to the second input of the add circuit 52 to produce a 10 bit address word which is supplied to a clocked latch 72. The 10 bit address word available at the output of the latch 72 is depicted by the waveform illustrated in FIG. 3A. It should be noted that the word is continuously updated at each system clock pulse. Also, at a first point 74 a 90° phase shift command is inserted (FIG. 3D) into the add circuit 50 and at a second point 76 a 180° phase shift command is inserted (FIG. 3D) into the add circuit 50 to illustrate the operation of the circuits. Thus, phase increments of 90° and 180° are instantly available by simple commands, and any other phase increment from 0° to 360° in 0.35° steps is available by means of the input data at the data bus 30. Frequency steps of 0.24 Hz are available over the entire operating range of DC to 1 MHz through the information supplied at the data bus 30. The 24 bit frequency word at the output of the latch 48 adjusts the constantly updated addresses developed by the pipelined accumulator to alter the number of steps in the address waveform of FIG. 3A and, thereby, alter the frequency at the output of the numerically controlled oscillator. It will of course be understood that the size and number of phase and frequency adjustments available depends upon the number of bits utilized in the various words throughout the system disclosed and more or less steps can be incorporated by utilizing more or less bits.

Referring specifically to FIG. 2, the two most significant bits of the 10 bit address word from the latch 72 are supplied to a clocked latch 80 as a quadrant control. A third input 81 to the latch 80 serves as an output sine/cosine lag/lead control which allows the output quadrature sine and cosine signals to instantly be switched in phase with respect to each other. Six of the bits of the 10 bit word are supplied, by way of a bus 82, to a fine sine read-only-memory (ROM) 84 and to a fine cosine ROM 86. Six of the bits of the 10 bit address word from the latch 72 are supplied by way of a bus 88 to a coarse sine ROM 90 and to a coarse cosine ROM 92. The ROMs 84, 86, 90 and 92 serve as lookup tables with the desired data being addressed by the 6 bit words supplied to the busses 82 and 88. The output data from the ROMs 84, 86, 90 and 92 are supplied to clocked latches 94, 96, 100, and 102, respectively. The clocked latches 94 and 96 then supply data to first inputs of add circuits 104 and 105, respectively, and the clocked latches 100 and 102 supply data to second inputs of the add circuits 104 and 105, respectively. The sum data, including the carry, from the add circuit 104 is supplied through OR gates 107 to a first input of a multiplexer 109 and to a second input of a multiplexer 110. The OR gates 107 are included to compensate for the single instance where all of the bits from the add circuit 104 are 1 and a 1 is added, which without compensation would provide an all 0 (or erroneous) output. The output data from the add circuit 105 is supplied directly to a first input of the multiplexer 110 and a second input of the multiplexer 109.

The mapping of a N-bit phase value into the corresponding M-bit cosine and sine waveform values is most easily accomplished by the use of a ROM with an N-bit address and M-bit output words. There are two primary difficulties attendant to the application of this approach to a numerically controlled oscillator on a semiconductor chip; (1) a ROM with address and word size compatible with high output spectral purity requires prohibitively large amounts of chip area; and (2) a ROM with address size matched to the address generator (FIG. 1) which precedes it can only provide order of magnitude slower access times than the maximum attainable clock rate of that generator, thus introducing a highly undesirable mis-match of on chip component capabilities. Thus, both size and speed barriers exist which tend to preclude the incorporation of a waveform generation ROM on the same semiconductor chip as the generator and remainder of the circuitry. Since the function performed by the ROM is essential to generation of high spectral purity waveforms, these barriers necessitate the high power consumption of off chip ROMs, with interconnection and associated propagation delays limiting the attainable operating speed of the functional ensemble.

To circumvent these problems the ROM size and the address generator size have been reduced in the following manner. First the sinusoidal waveform has been decomposed into coarse and fine components. The decomposition property of a sinusoidal waveform, which permits the representation of the sine by the sum of two arguments in terms of the sine and cosine values of each of the arguments is illustrated by the following equations.

$$\text{SIN } X + Y = \text{SIN } X \text{ COS } Y + \text{COS } X \text{ SIN } Y \quad (1)$$
$$\simeq \text{SIN } X + Y \text{ COS } X$$

$$\text{COS } X + Y = \text{COS } X \text{ COS } Y - \text{SIN } X \text{ SIN } Y \quad (2)$$
$$\simeq \text{COS } X - Y \text{ SIN } X$$

Analysis of the amplitudes of spurious components generated by this approximation show that it is compatible with high spectral purity synthesis. A "coarse" sinusoid value, corresponding to the address MSBs, need only have a "fine" sinusoid value, an appropriately scaled version of the coarse values, added to it to provide an effective increase in phase resolution. As the number of binary bits associated with the sinusoid amplitude increases beyond the number of binary bits associated with the sinusoid phase (ROM address), this approach yields significant mitigation of phase quantization effects at the expense of additional processing.

Since it is impractical to allocate more bits to amplitude representation than phase quantization (the phase quantization spectral spurs then dominant the output), any attempt to apply the decomposition technique without carefully considering the effects of significant amplitude quantization effects will yield unsatisfactory results; the resultant spectral purity will generally correspond to that obtainable using only the coarse phase bits. The difficulty associated with exploiting the decomposition property is compounded enormously because the NCO is so constrained for space and speed that it must make use of a second ROM size reduction technique, to be explained presently, referred to as the quadrant replication property. It is not obvious that the decomposition and quadrant replication properties are compatible in a quantized processor. Unfortunately, to reduce the NCO chip to die sizes compatible with reasonable yield, and to effectively match the speed capabilities of the address generation portion of the chip with the waveform generation portion, it is necessary to develop a method which achieves precisely this efficient simultaneous exploitation of the quadrant replication and decomposition properties of the sinusoid.

One hurdle immediately encountered in attempting to simultaneously exploit the quadrant-replication and decomposition properties of the sinusoid involves the effect of the quadrant-mapping upon a sum. It can be demonstrated that the operation of taking the ones-complement of a sum (modulo $2^k$) of two binary numbers may be decomposed into simple, independent binary operations upon each of the addends. This result from number theory implies that, so long as the correction (fine) term is large enough to correct any error arising from the quantized coarse value assignments, the optimization of the output may be accomplished simply by optimizing over the fine values alone. The result converts a mathematically intractable optimization problem into one which is both conceptually appealing and tractable.

The methodology developed for compressing the NCO ROM size consists of these four phases:
1. Definition of first quadrant coarse sine and cosine values.
2. Generation of corresponding full cycle coarse values, employing the mapping defined in Table 1.
3. Generation of full cycle error waveform equal to ideal (infinite phase resolution, infinite amplitude resolution) sine and cosine values minus corresponding coarse values.
4. Calculation of first quadrant fine (correction) values which optimize the match of the synthesized (coarse plus fine) waveform to the ideal waveform.

TABLE 1

| SINUSOID QUADRANT REPLICATION | | | | |
|---|---|---|---|---|
| | FIRST QUADRANT (Assumed known) | SECOND QUADRANT (TBD) | THIRD QUADRANT (TBD) | FOURTH QUADRANT (TBD) |
| SIN(X) | SIN(X) = A | $\text{SIN}\left(X + \frac{\pi}{2}\right) = B$ | $\text{SIN}(X + \pi) = -A$ | $\text{SIN}\left(X + \frac{3\pi}{2}\right) = -B$ |

TABLE 1-continued

SINUSOID QUADRANT REPLICATION

| FIRST QUADRANT (Assumed known) | SECOND QUADRANT (TBD) | THIRD QUADRANT (TBD) | FOURTH QUADRANT (TBD) |
|---|---|---|---|
| COS(X) COS(X) = B | $\cos\left(X + \frac{\pi}{2}\right) = -A$ | $\cos(X + \pi) = -B$ | $\cos\left(X + \frac{3\pi}{2}\right) = A$ |

Computation of the optimal correction (fine) ROM values of the fourth phase requires recognition of each of the two distinct but interrelated mechanisms which contribute to the error waveform. The first mechanism corresponds to the coarse ROM amplitude quantization effect, which introduces error through either truncation or round-off. The second mechanism corresponds to the decomposition correction term (assuming no amplitude quantization effects.) The key observation is that both error terms exhibit strong quadrant periodicity, indicating that a single quadrant correction quadrant-mapped over the entire cycle is effective.

Conceptually, the task consists of creating the best discrete-point fit to the error waveform subject to constraints on the number of bits available for both phase and amplitude resolution of the fine ROM values. The constraint upon the number of phase bits is quite complicated, involving a subtle interaction of system design and chip architecture desirerata. For maximum speed of waveform generation, the access time of the coarse and fine ROMs must be identical (i.e., same number of address bits); otherwise, the slower one is limiting the maximum operating speed. In addition, reduction of address decoder size dictates that the MSBs of the coarse and fine ROM addresses be identical. Thus, the phase address input to the waveform generator is partitioned as shown below.

| NQ | NA | NC | NF |
|---|---|---|---|

NQ $\triangleq$ number of Quadrant definition bits (=2)
NA $\triangleq$ number of Bits common to address of coarse ROM and fine ROM
NC $\triangleq$ number of Bits unique to address of coarse ROM
NF $\triangleq$ number of Bits unique to address of fine ROM
NC=NF Heuristically, as more bits (of a fixed size word) are assigned to common address, the error waveform amplitude tends to diminish, but fewer bits are available to the fine ROM to permit correction. At each extreme (all common, none common), the coarse/fine decomposition offers no ROM compression effect. The optimization routine operates by choosing the best possible fit (correction) to the error waveform for any specified manner of partitioning the phase address word, generating in the process the rms and maximum residual error associated with that particular partition. By operating the program over all possible partitions associated with all potential address word sizes, the performance measures shown in Table 2 were generated.

TABLE 2

SUMMARY OF ROM COMPRESSION PERFORMANCE FOR AVAILABLE OPTIONS

| NA + NC = NA + NF | NQ + NA + NC + NF = N | NA | Number Of Amp. Bits | ERROR RMS($\times 2^{13}$) | MAX($\times 2^{13}$) |
|---|---|---|---|---|---|
| 5 | 11 | 1 | 8 | 19.8 | 72 |
| 5 | 11 | 1 | 10 | 17.7 | 57 |
| 6 | 11 | 3 | 8 | 9.5 | 24 |
| 6 | 11 | 3 | 10 | 3.1 | 1 |
| 7 | 11 | 5 | 8 | 28.4 | 78 |
| 7 | 11 | 5 | 10 | 15.2 | 45 |
| 5 | 10 | 2 | 8 | 13.2 | 43 |
| 5 | 10 | 2 | 10 | 3.7 | 10 |
| 6 | 10 | 4 | 8 | 3.5 | 24 |
| 6 | 10 | 4 | 10 | 2.3 | 3 |
| 7 | 10 | 6 | 8 | 27.3 | 55 |
| 7 | 10 | 6 | 10 | 12.7 | 24 |
| 4 | 9 | 1 | 8 | 34.3 | 119 |
| 4 | 9 | 1 | 10 | 33.3 | 117 |
| 5 | 9 | 3 | 8 | 9.4 | 24 |
| 5 | 9 | 3 | 10 | 4.2 | 4 |
| 6 | 9 | 5 | 8 | 29.7 | 84 |
| 6 | 9 | 5 | 10 | 19.1 | 57 |

Having thus determined the optimal ROM size and contents for each potential address partitioning scheme, the selection of the particular implementation reduces to matching the speed/size characteristics of the waveform generation portion of the speed/size characteristics of the rest of the chip. Using current technology, no greater than 6-bit ROM addresses were practical. A 10-bit ROM word provided the necessary speed match to this address size, and the 10-bit amplitude quantization dictated a 10-bit phase quantization. Thus, from Table 2, the attainable rms error associated with the selected architecture is only 2 units (1 bit) out of 13 bits, where 13 bits were carried for the ideal value to guarantee effectively "infinite resolution" relative to the 10-bit quantization effects under consideration. The maximum error is seen to be only 0.75 of the LSB in a 10-bit representation. Effectively, this approach provides a full 10-bits of both phase and amplitude resolution. The effective savings in ROM size is summarized in Table 3.

TABLE 3

RELATIVE ROM SIZES FOR VARIOUS COMPRESSION TECHNIQUES

| TECHNIQUE | ROM SIZE TO ACCOMMODATE 10-BIT PHASE AND AMPLITUDE RESOLUTION |
|---|---|
| NO COMPRESSION | 20,480 |
| QUADRANT REPLICATION ONLY | 5,120 |
| QUADRANT REPLICATION PLUS DECOMPOSITION | 1,728 |

The 10-bit output words from the multiplexers 109 and 110 are each supplied to 10 exclusive OR gates 112 and 114, respectively. Outputs of the latch 80 are supplied directly to the select inputs of the multiplexers 109 and 110 and to a pair of exclusive OR gates 116 and 117, the outputs of which are connected to the exclusive OR gates 112 and 114, respectively. The quadrant replication property is implemented by means of the multiplexers 109 and 110, the latch 80, the exclusive OR gates 112, 114, 116 and 117. Since the values of the sine and cosine over the first quadrant are available at the outputs of the add circuits 104 and 105, respectively, the sine and cosine values in each of the other three quadrants may be obtained by changing polarity and exchanging sine and cosine VALUES according to the scheme defined by Table 1 above. This scheme reduces the required memory by a factor of 4, trading off the reduced memory for additional multiplexing and arithmatic operations. It is possible to further reduce the arithmatic complexity by converting the polarity inversion operation, requiring an M-bit ripple-add, to a simple parallel inversion of all M-bits; this conversion requires only that an appropriate bias be added to each sinusoidal value. The quadrant controls supplied to the latch 80 select the correct input at each of the multiplexers 109 and 110 and the exclusive OR gates 112 and 114 provide inversion when required according to Table 1. Thus, a continuous digital sinusoidal wave is provided at the output of each of the exclusive OR gates 112 and 114, which sinusoidal waves are supplied to clock latches 118 and 119, respectively. The sinusoidal wave applied to the latch 118 is illustrated in FIG. 3B and the sinusoidal wave applied to the latch 119 is illustrated in FIG. 3C. When referring to these waves as continuous sinusoidal waves, it is meant that the four quadrants are assembled in a continuous fashion (as illustrated in FIG. 3) and so that no discontinuities appear at the demarkation points of each quadrant. Digital-to-analog converters 120 and 121 are connected to receive the outputs of the latches 118 and 119, respectively, the digital-to-analog converters 120 and 121 are external to the chip containing the NCO. Additional smoothing filters may be incorporated if desired to obtain the analog version of the output frequency.

Figure 4:
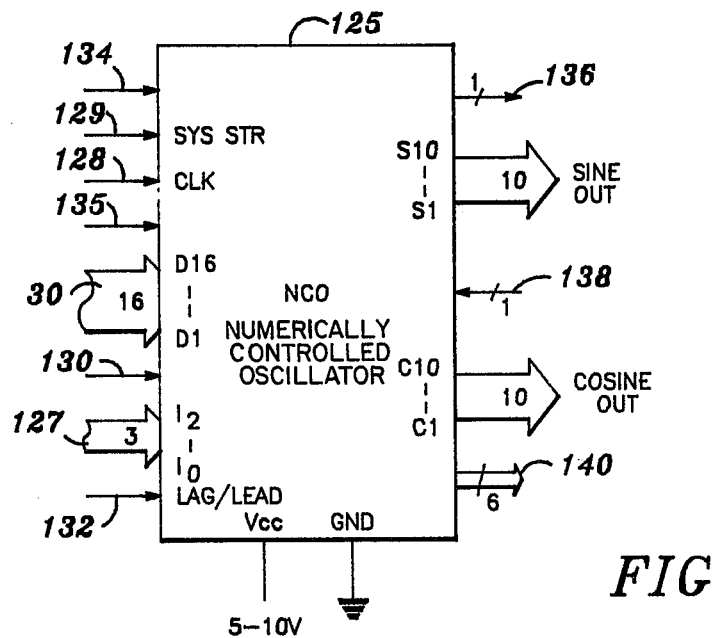
FIG. 4 is a diagram of the inputs and outputs of a chip containing the numerically controlled oscillator of FIGS. 1 and 2.

Referring specifically to FIG. 4, the numerically controlled oscillator disclosed in FIGS. 1 and 2 is illustrated as a semiconductor chip 125 with the inputs and outputs thereto illustrated. The 16 line data bus 30 is used to input all phase and frequency information. A three line function select bus 127 selects one of 8 possible modes of operation and can be modified every 4 system clock periods. The various modes of operation are illustrated in Table 4 below.

TABLE 4

| | MNCO FUNCTION SELECT COMMANDS | | | | |
|---|---|---|---|---|---|
| MNEMONIC | FUNCTION | L | $\overline{R}$ | $I_2$ | $I_1$ | $I_0$ |
| NOP | NO OPERATION | X | 1 | 0 | 0 | 0 |
| FLAM | FREQUENCY LOW-ORDER BITS ADDITIVE | X | 1 | 0 | 0 | 1 |
| P180 | 180° PHASE BUMP | X | 1 | 0 | 1 | 0 |
| PIM | PHASE INTEGRATE MODE | X | 1 | 0 | 1 | 1 |
| P090 | 90° PHASE BUMP | X | 1 | 1 | 0 | 0 |
| FHAM | FREQUENCY HIGH-ORDER BITS ADDITIVE MODE | X | 1 | 1 | 0 | 1 |
| PAM | PHASE ADDITIVE MODE | X | 1 | 1 | 1 | 0 |
| FLIM | FREQUENCY LOW-ORDER BITS INTEGRATE MODE | X | 1 | 1 | 1 | 1 |
| RST | RESET | X | 0 | X | X | X |
| LGLD | LEAD (I = Q + 90°) | 0 | 1 | X | X | X |
| | LAG (I = Q − 90°) | 1 | 1 | X | X | X |

Figure 5:
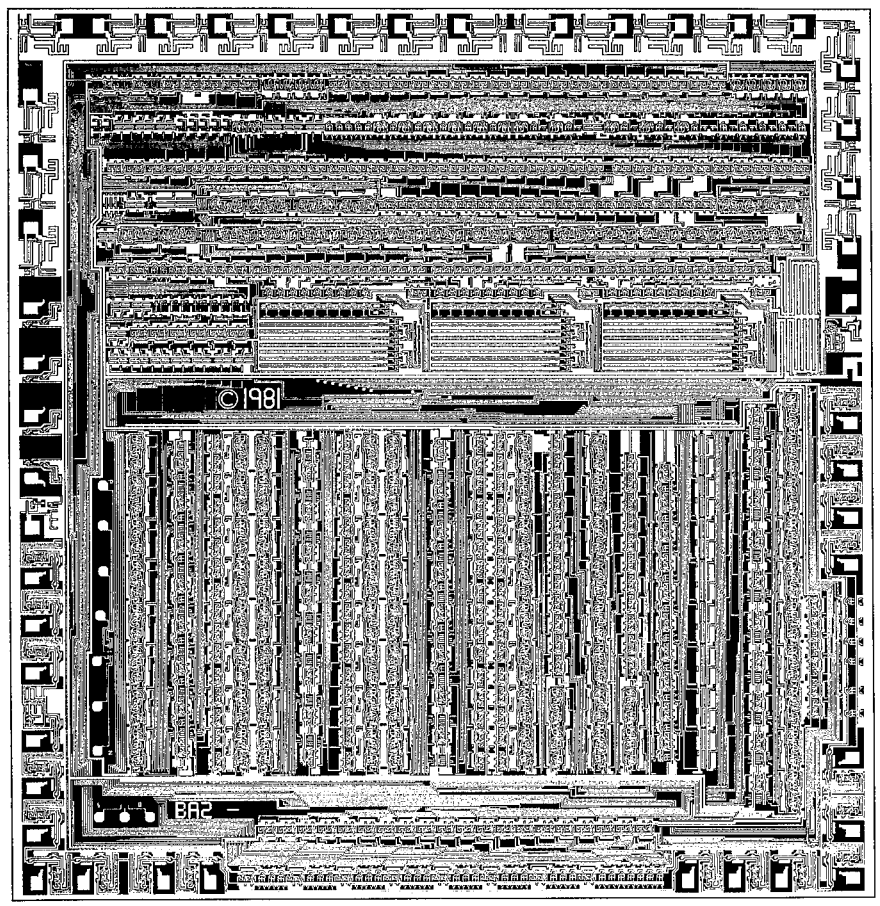
FIG. 5 is a view in top plan of a semiconductor chip including the apparatus illustrated in block form in FIGS. 1 and 2.

A single input line 128 is connected to the external system clock, which is a steady, crystal controlled clock that is the reference used to clock all internal timing of the numerically controlled oscillator. A single input line 129 is a system strobe input to the numerically controlled oscillator internal system timing to facilitate proper input latching of potentially asynchronous input data (on the 16 line data bus 30). A single input line 130 receives a reset signal which allows the numerically controlled oscillator programmer to set all accumulators and registers internal to the NCO to a 0 state. A single input line 132 receives an output sine/cosine lag/lead control signal which allows the output quadrature sine and cosine signals to instantly be switched in phase 180 with respect to each other. A test address input line 134, a test enable line 135 and a test address output line 136 allow quick entry of test addresses to the numerically controlled oscillator's internal ROMs and allows rapid visibility of all bits of the 24 bit accumulator preceding the ROMS. An input line 138 is adapted to receive a tri-state control signal which switches outputs to high impedance state of high/low logic levels. In addition, the chip 125 includes a 6 lead output bus 140 which is attached to test transistors on the chip 125. The test transistors are N and P channel thin oxide and an N channel thick oxide device to allow on chip monitoring of radiation degradation. Referring specifically to FIG. 5, a view in top plan of the actual chip 125 is illustrated, increased approximately 25 times in size. All of the apparatus illustrated in FIGS. 1 and 2 is contained on the chip 125, except the D to A converters 120 and 121.

Figure 6:
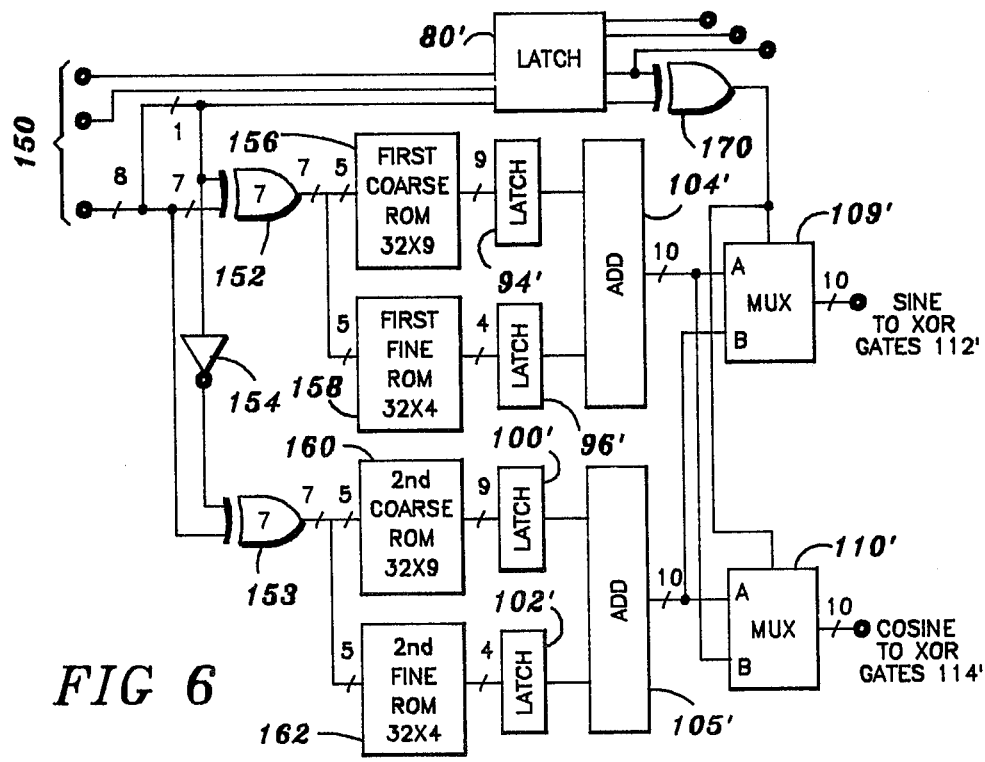
FIG. 6 is a simplified block diagram of a modification of the apparatus illustrated in FIG. 2.

Referring specifically to FIG. 6, a simplified block diagram of a modification of the apparatus illustrated in FIG. 2 is illustrated. Components which are similar to those illustrated in FIG. 2 have a similar number designation with a prime added to indicate that it is a modified embodiment thereof. The 10 lead output bus from latch 72 (FIG. 1) is connected to a 10 lead input 150. The two most significant bits are connected to latch 80', as in the embodiment of FIG. 2 and the remaining 8 bits are supplied to 7 exclusive OR gates 152 and 7 exclusive OR gates 153. The most significant bit of the 8 bits is connected to latch 80' and to a first input of each of the 7 exclusive OR gates 152 and, through an inverter 154, to a first input of each of the 7 exclusive OR gates 153. The 7 remaining bits are each connected to a second input of a different one of the 7 exclusive OR gates 152 and to a second input of a different one of the 7 exclusive OR gates 153. Five of the seven leads from the exclusive OR gates 152 are connected as an address to a first coarse ROM 156, 5 of the leads are connected as an address to a first fine ROM 158. In a similar fashion, 5 of the 7 output leads from the exclusive OR gates 153 are connected as an address to a second coarse ROM 160 and 5 leads are connected to a second fine ROM 162. As in the embodiment illustrated in FIG. 2, the outputs of the first coarse and fine ROMs 156 and 158 are supplied to closed latches 94', 96', respectively, which then supply data to an add circuit 104' and the outputs of the ROMs 160 and 162 are supplied to clocked latches 100' and 102', respectively, which the supply data to an add circuit 105'. The outputs of the add circuits 104' and 105' are then connected to two inputs of a pair of multiplexers 109' and 110' as disclosed in the embodiment of FIG. 2. The multiplex selection circuit for the present embodiment differs from that of FIG. 2 in that an exclusive OR gate 170 is connected between the latch 80' and the selecting inputs of the multiplexers 109' and 110' for purposes that will become apparent presently.

In the operation of the embodiment illustrated in FIG. 6, all of the values for defining a coarse approximation of the first quadrant of a sine or cosine wave are stored in the first or second coarse ROMs 156 and 160. All of the fine values to be added to the coarse values to specifically define the first quadrant are stored in the fine ROMs 158 and 162. To select the values necessary to produce a SINE wave output from the oscillator, the addresses simply step through the values stored in the first coarse ROM 156 and then continue to step through the values stored in the second coarse ROM 160. For purposes of this explanation this can be considered a forward sequence. While the address supplied to the first coarse ROM 156 by the exclusive OR gates 152 is stepping through the values stored therein in a forward sequence, the address supplied to the second coarse ROM 160 by the exclusive OR gates 153 can be stepping through the values therein in a reverse direction. Assuming that the same number of values are stored in both the first and second coarse ROMs 156 and 160, when the values in the first coarse ROM have been read out in a forward direction the values in the second coarse ROM will have been read out in a reverse direction and the order in which the values in each of the ROMs are supplied to the add circuits 104' and 105' can be reversed and multiplexer 109' selected to exchange the add circuits' outputs to complete the generation of a full quadrant. The second and fourth quadrants are generated by reading the ROMs in reverse order for the sine and forward order for the cosine. In a similar fashion fine ROMs 158 and 162 can be addressed to supply the fine components required to complete a simulation of the desired quadrants. Thus, only a single quadrant of a sine or cosine waveform is stored in the four ROMs of the embodiment illustrated in FIG. 6, whereas a first quadrant of a sine and cosine waveform are stored in the four ROMs of the embodiment of FIG. 2. It is estimated that this modification of the numerically controlled oscillator reduces the number of memory bits required in the ROMs by 832 bits.

Since the phase word applied to the ROMs is stepped linearly through a complete sequence, the phase word can actually be used as a coarse approximation of the sine wave. The values in the coarse ROM can then be used to correct the coarse approximation rather than supply the whole value as in the embodiments illustrated. In this fashion fewer coarse ROM bits need to be stored. For example, the two most significant bits can be eliminated to reduce the storage required in the ROMs by another 128 bits. In addition to these savings it has been noted that the values stored in the fine ROMs are periodically 0. The address to this ROM may be partially decoded so that only one physical location containing 0 will respond to all addresses that should contain 0. Additional applications of this principle eliminating identical storage locations may be possible in specific cases. The elimination of the multiple stored 0's saves 21 more bits in the storage and it is estimated that as many as 60 bits could be saved, or eliminated.

Thus, a numerically controlled oscillator is disclosed wherein the entire digital frequency control and generation circuitry is available on one low power, radiation-hardened chip. In a fixed frequency mode, the stability of the synthesizer/oscillator is determined by the stability of one external fixed frequency oscillator. There are no analog control elements or variable oscillators to introduce instability and the output is generated digitally from the single external oscillator, which can be built with higher radiation resistance, better thermal and aging characteristics, and greater stability than would be possible if analog control elements and variable oscillators were required. Frequency multiplying with the NCO can be performed by connecting the 10 outputs of each chip to a multiplexer having a 10 lead input for each chip used and a single 20 lead output. The 10 bit output of the multiplexer is then supplied to a 10 bit D to A converter which must be capable of processing the incoming digital data fast enough to produce a clear sinusoidal wave at the output.

While we have shown and described specific embodiments of this invention, further modifications and improvements will occur to those skilled in the art. We desire it to be understood, therefore, that this invention is not limited to the particular forms shown and we intend in the appended claims to cover all modifications which do not depart from the spirit and scope of this invention.

We claim:

1. A function generator for generating generally sinusoidally shaped waves having a digitally controlled frequency comprising:

(a) coarse digital memory means, having an address input and an output, for storing a plurality of digital values coarsely defining one quadrant of a sinusoidal wave;

(b) fine digital memory means, having an address input and an output, for storing a plurality of digital values which when added to predetermined values stored in said coarse memory means substantially define the one quadrant of the sinusoidal wave;

(c) digital addition means connected to the outputs of said coarse and fine memory means for combining output values therefrom to substantially define the one quadrant of the sinusoidal wave;

(d) digital logic means connected to said addition means for shifting the combined output values to substantially define second, third and fourth quadrants of the sinusoidal wave in response to control signals supplied thereto; and (e) address generating means having outputs connected to said coarse and fine memory means and to said logic means for addressing stored values in said coarse and fine memory means in a correct sequence to generate the one quadrant of the sinusoidal wave in the addition means and for supplying control signals to said logic means to generate a continuous sinusoidal wave.

2. A function generator as claimed in claim 1 wherein the address generating means includes an input for a digital signal and input circuitry for adjusting the phase and frequency of the generated sinusoidal wave in accordance with digital signals containing phase and frequency information supplied to the input.

3. A function generator as claimed in claim 1 wherein the coarse and fine memory means each include a read-only-memory (ROM) containing quantum sine values defining one quadrant of a sine wave and a ROM containing quantum cosine values defining one quadrant of a cosine wave, and continuous sine and cosine sinusoidal waves are generated.

4. A function generator as claimed in claim 3 wherein the digital logic means includes multiplexers having the single quadrant of a sine and cosine sinusoidal wave supplied thereto, the control signals being supplied to said multiplexers to select from the sine quadrant, the cosine quadrant, an inverted sine quadrant and an inverted cosine quadrant to provide continuous sine and cosine sinusoidal waves.

5. A function generator as claimed in claim 1 wherein the claimed generator is included on a single semiconductor chip.

6. A function generator as claimed in claim 1 wherein the address generating means generates a ten bit word for coarse and fine address and logic control signals, the two most significant bits being the logic control signals, the next four most significant bits being supplied in common as part of both the coarse and fine addresses, the next two most significant bits being supplied with the prior common four bits as the complete coarse address and the two least significant bits being supplied with the prior common four bits as the complete fine address.

7. A function generator as claimed in claim 1 wherein the address generating means includes input means for receiving a multi-bit digital word representative of a desired output frequency.

8. A function generator as claimed in claim 1 wherein the coarse and fine memory means each include a pair of read-only-memories (ROM), the pairs of ROM's having stored therein coarse quantum sine values and fine quantum sine values, and means for accessing each pair of ROM's in a forward/reverse alternating order to generate a sine wave and in a reverse/forward alternating order to generate a cosine wave.

9. A function generator for generating generally sinusoidally shaped waves approximately 90° out of phase comprising:

(a) a pair of coarse digital read-only memories, each having an address input and an output, for storing a plurality of digital values coarsely defining one quadrant of a first sinusoidal wave, approximately one-half of the values being stored in each of said coarse memories;

(b) a pair of fine digital read-only-memories, each having an address input and an output, for storing a plurality of digital values which when added to predetermined values stored in said coarse memories substantially define the one quadrant of the first sinusoidal wave, approximately one-half of the values being stored in each of said fine memories;

(c) digital addition means connected to the outputs of said coarse and fine memories for combining output values therefrom to substantially define the one quadrant of the first sinusoidally shaped wave and one quadrant of a second sinusoidally shaped wave 90° out of phase with the first wave;

(d) digital logic means connected to said addition means for shifting the combined output values to substantially define second, third and fourth quadrants of the first and second sinusoidal waves in response to control signals supplied thereto; and (e) address generating means having outputs connected to said coarse and fine memories and to said logic means for addressing stored values in said coarse and fine memories in a forward sequence to generate the one quadrant of the first sinusoidal wave and for addressing stored values in said coarse and fine memories in a reverse sequence to generate the one quadrant of the second sinusoidal wave, and for supplying control signals to said logic means to generate continuous sinusoidal waves.

10. A function generator for generating generally sinusoidally shaped waves having a digitally controlled frequency comprising:

(a) coarse digital memory means, having an address input and an output, for storing a plurality of digital values, sin X and cos X, generally defining one quadrant of a sine and a cosine wave;

(b) fine digital memory means, having an address input and an output, for storing a plurality of digital values, YcosX and YsinX;

(c) digital addition means connected to the outputs of said coarse and fine memory means for combining output values therefrom in accordance with the equations $$\sin(X+Y) = \sin X + Y \cos X$$

$$\cos(X+Y) = \cos X - Y \sin X$$

to substantially define one quadrant of each of the sinusoidal waves;

(d) digital logic means, including multiplexers, having the single quadrant of the sin (X+Y) and cos (X+Y) waves supplied thereto and connected for selecting from the single quadrants and inversions of the single quadrants, in response to control signals supplied thereto, to provide continuous sine and cosine sinusoidal waves; and (e) address generating means having outputs connected to said coarse and fine memory means and to said logic means for addressing stored values in said coarse and fine memory means in a correct sequence to generate the one quadrant of each of the sinusoidal waves in the addition means and for supplying control signals to said logic means to generate continuous sinusoidal waves.

11. A function generator as claimed in claim 10 wherein the address generating means includes an input for a digital signal and input circuitry connected to said input for adjusting the phase and frequency of the generated sinusoidal wave in accordance with digital signals supplied to the input.

12. A function generator as claimed in claim 11 wherein the address generating means further includes circuitry for generating a ten bit word for coarse and fine address and logic control signals, the two most significant bits being the logic control signals, the next four most significant bits being supplied in common as part of both the coarse and fine address, the next two most significant bits being supplied with the prior common four bits as the complete coarse address and the two least significant bits being supplied with the prior common four bits as the complete fine address.

13. A function generator as claimed in claim 12 wherein the claimed generator is included on a single semiconductor chip.

14. A function generator as claimed in claim 10 wherein the outputs of the address generating means is a first approximation of the one quadrant of the sinusoidal waves to be defined.

15. A function generator as claimed in claim 10 wherein the address input for addressing similar stored values in each of the coarse and fine digital memory means are connected to a single stored value in each of the coarse and fine digital memory means.

16. A method of generating generally sinusoidally shaped waves having a digitally controlled frequency and phase comprising the steps of:

(a) storing a plurality of values defining coarse approximations, sin X and cos X, of a single quadrant of each of sinusoidally shaped waves, sin $(X+Y)$ and cos $(X+Y)$, respectively;

(b) storing a plurality of fine adjustments, $Y \cos X$ and $Y \sin X$, which when added to predetermined coarse values substantially define the single quadrants of the sinusoidally shaped waves;

(c) receiving a digital input signal dictating the desired frequency and any phase changes;

(d) generating coarse and fine digital addresses for retrieving stored coarse and fine values in a correct sequence to generate the single quadrants of the sinusoidal waves at the dictated frequency in accordance with the received signal, the generated digital addresses also containing bits for controlling combining of the single quadrants to form continuous sinusoidal waves; and (e) retrieving and adding the stored coarse and fine values in the sequence dictated by the digital addresses and combining the single quadrants to provide continuous sinusoidally shaped waves.

17. A method as set forth in claim 16 wherein the step of generating coarse and fine digital addresses includes generating an optimum plurality of bits which are common to both the coarse and fine digital addresses, generating a first plurality of bits unique to the coarse address, and generating a second plurality of bits, equal in number to the first plurality, unique to the fine address.

* * * * *